Feb. 8, 1966  O. FREGEOLLE  3,233,430
KNITTING METHOD
Filed Jan. 23, 1961  10 Sheets-Sheet 1
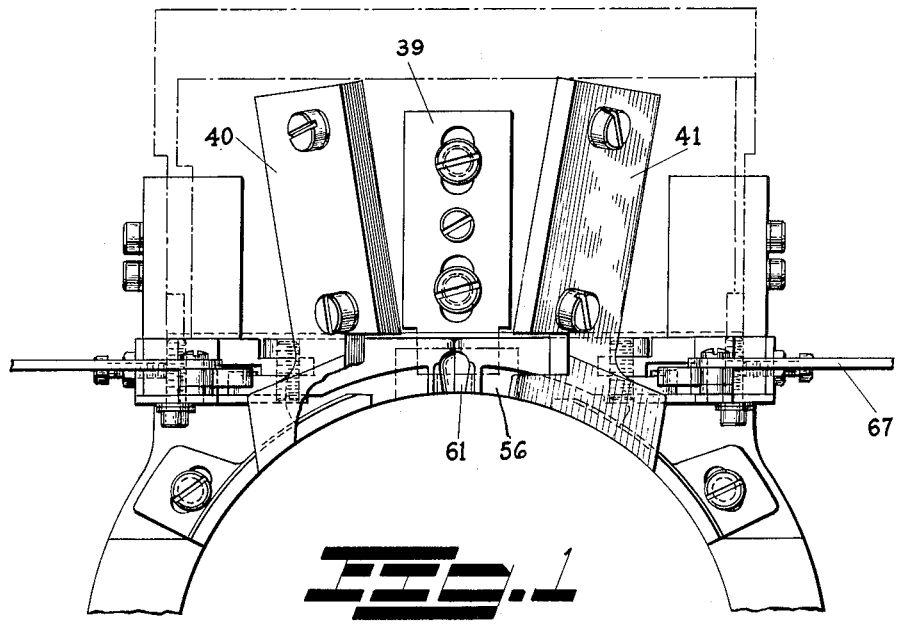
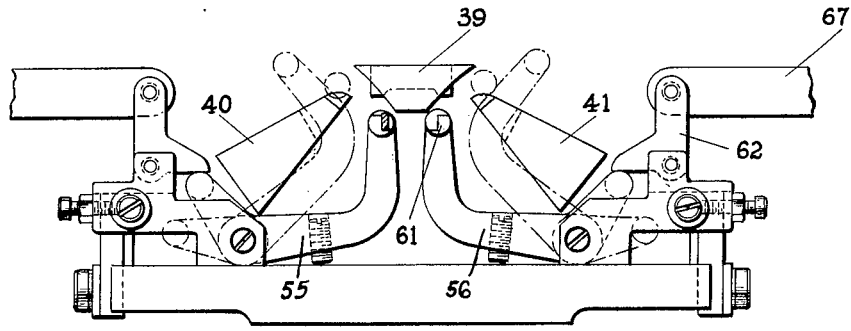
INVENTOR.
OSCAR FREGEOLLE
BY
Rodney C. Southworth
ATTORNEY

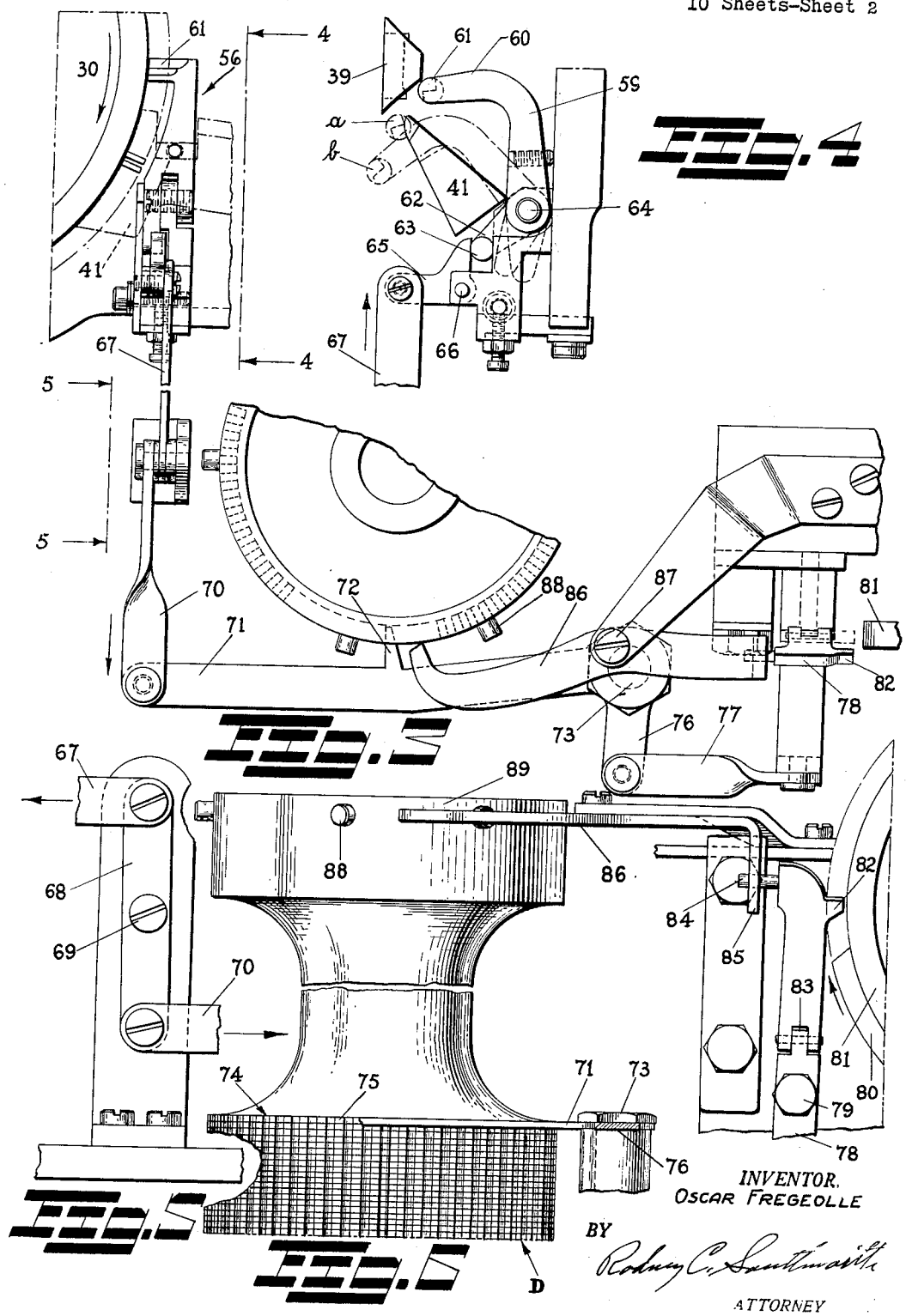

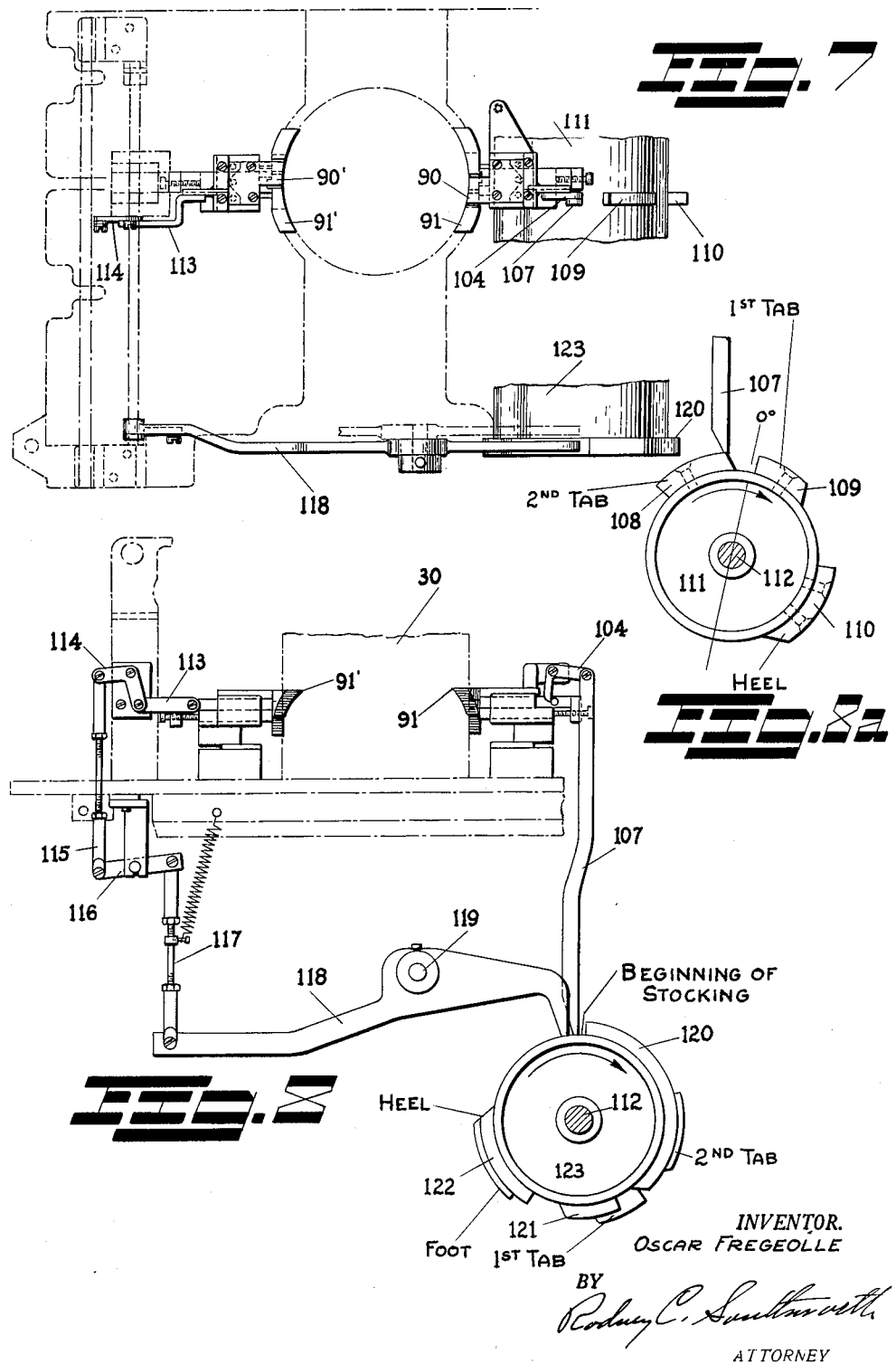

Feb. 8, 1966  O. FREGEOLLE  3,233,430
KNITTING METHOD
Filed Jan. 23, 1961                                10 Sheets-Sheet 4
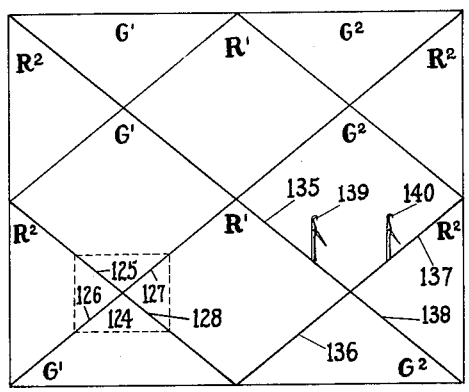
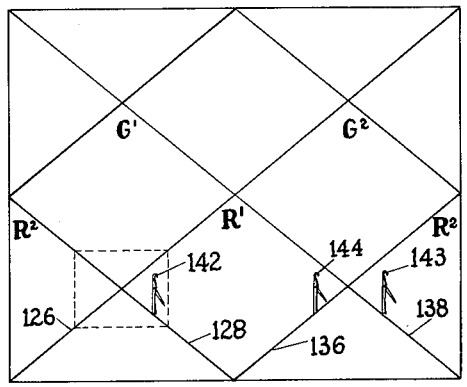
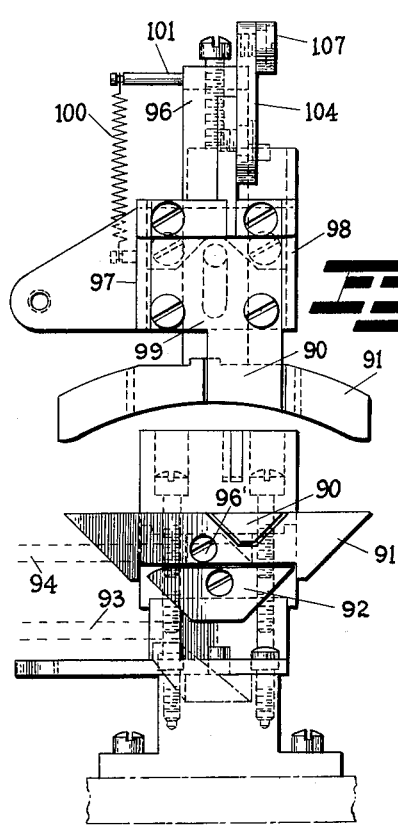
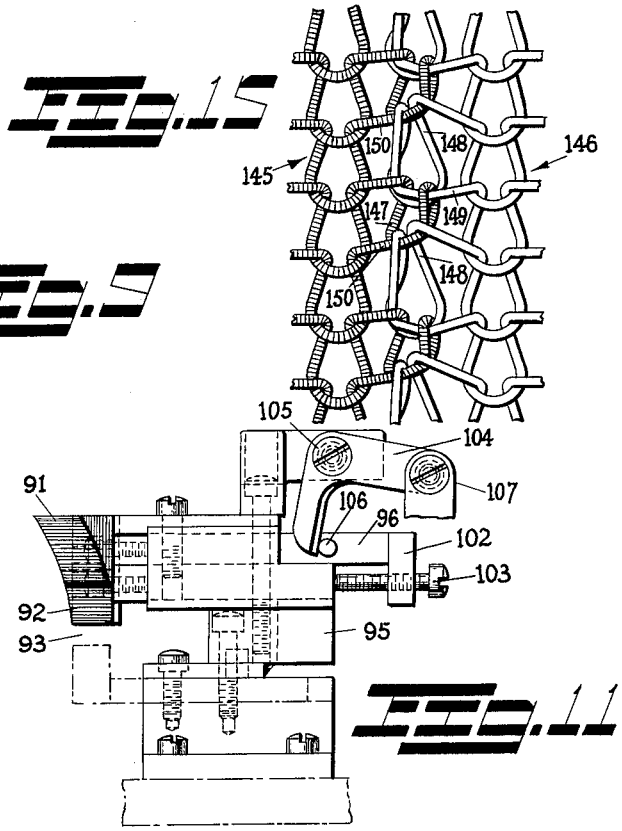
INVENTOR.
OSCAR FREGEOLLE
BY
ATTORNEY Feb. 8, 1966  O. FREGEOLLE  3,233,430
KNITTING METHOD
Filed Jan. 23, 1961  10 Sheets-Sheet 5
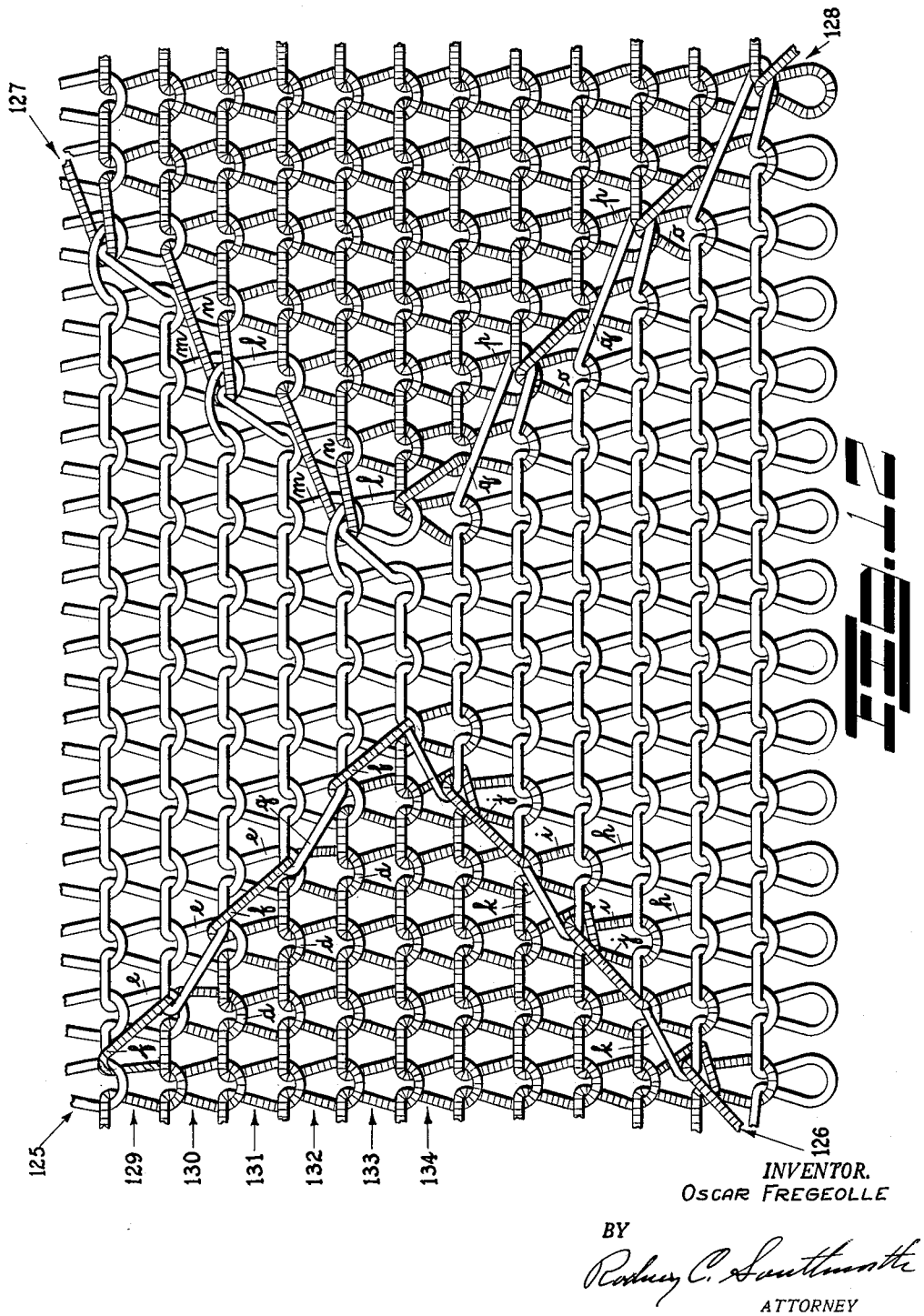
INVENTOR.
Oscar Fregeolle
BY
Rodney C. Southworth
ATTORNEY

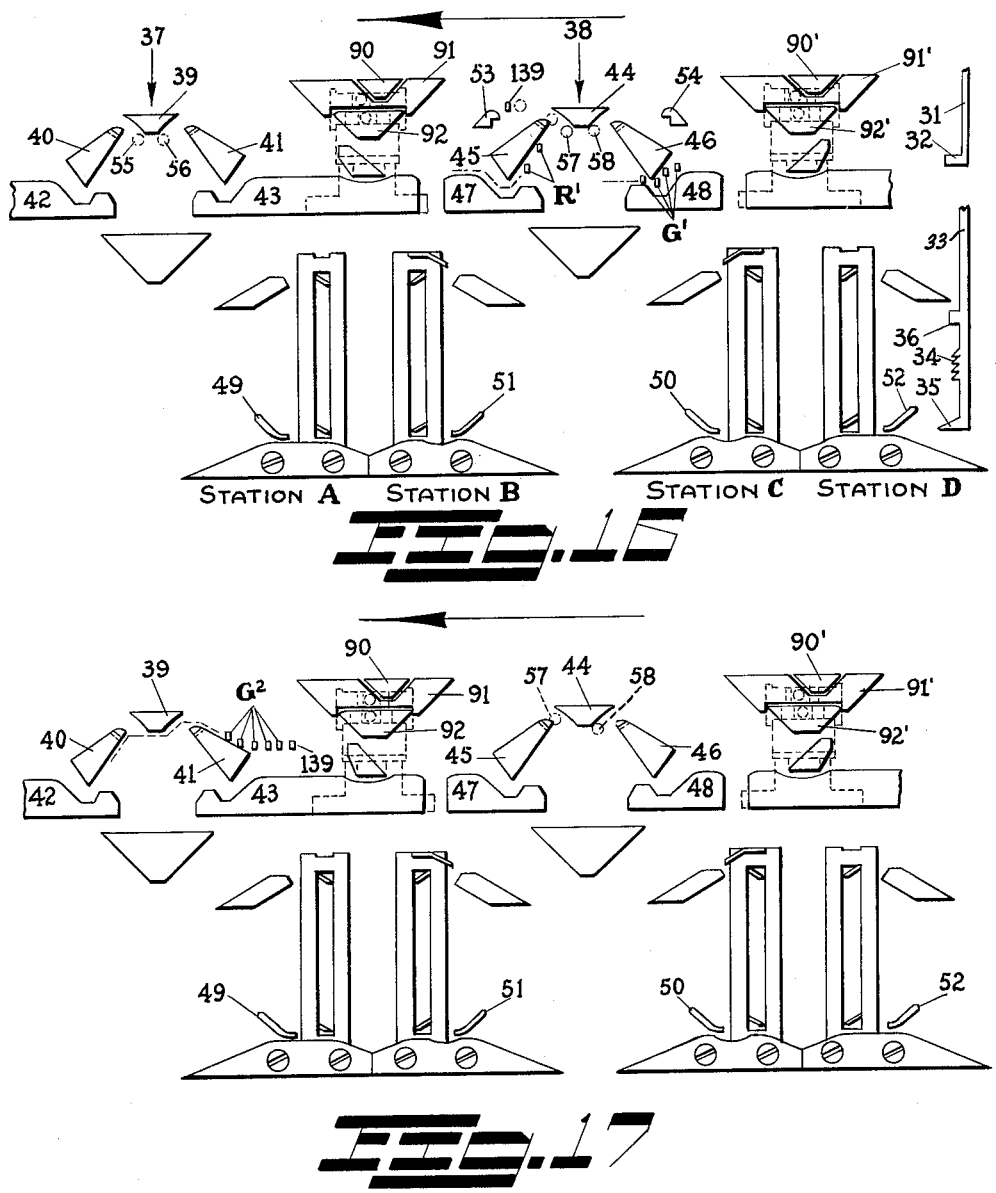

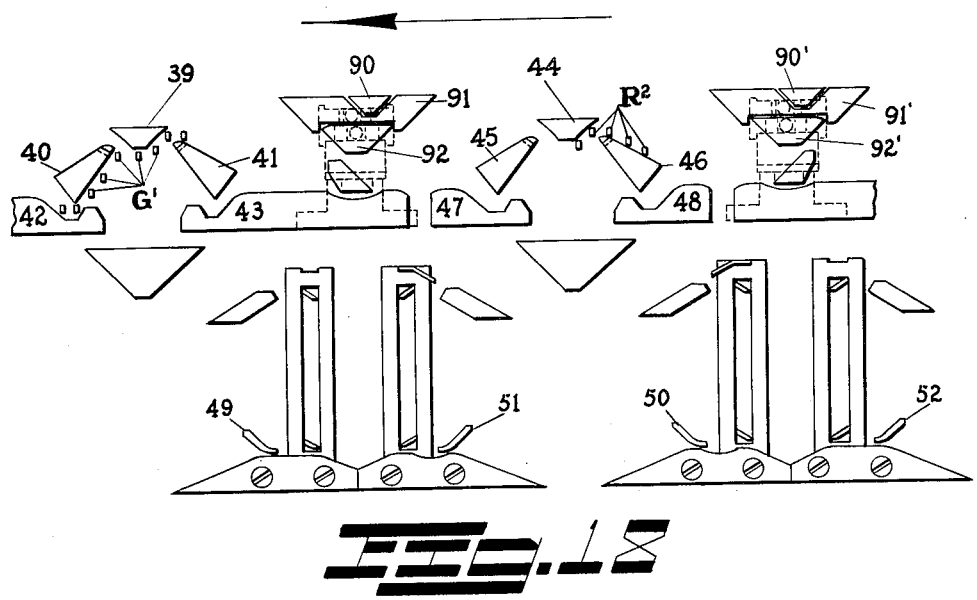
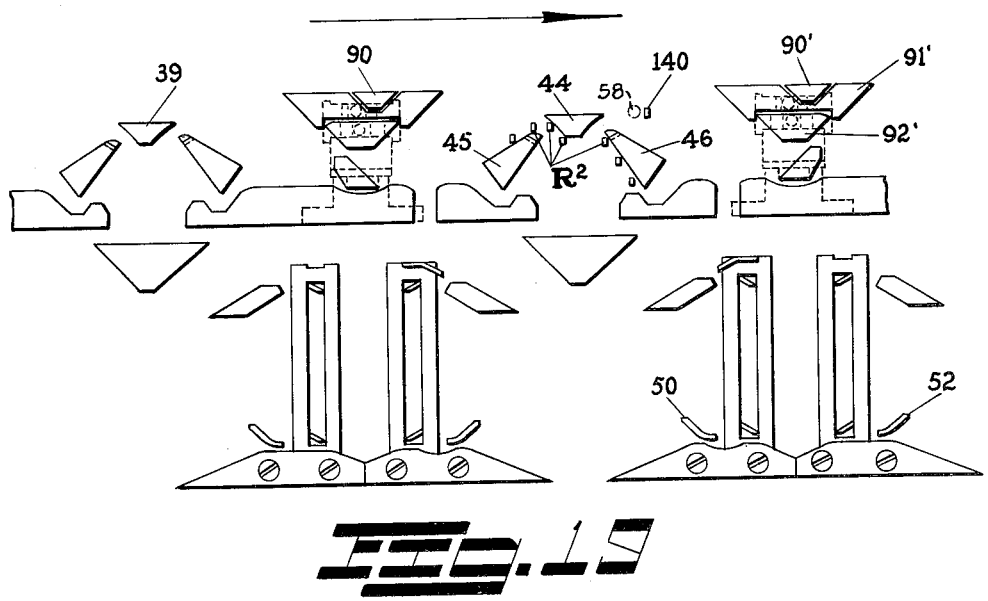

INVENTOR.
OSCAR FREGEOLLE

INVENTOR.
OSCAR FREGEOLLE
BY
Rodney C. Southworth
ATTORNEY

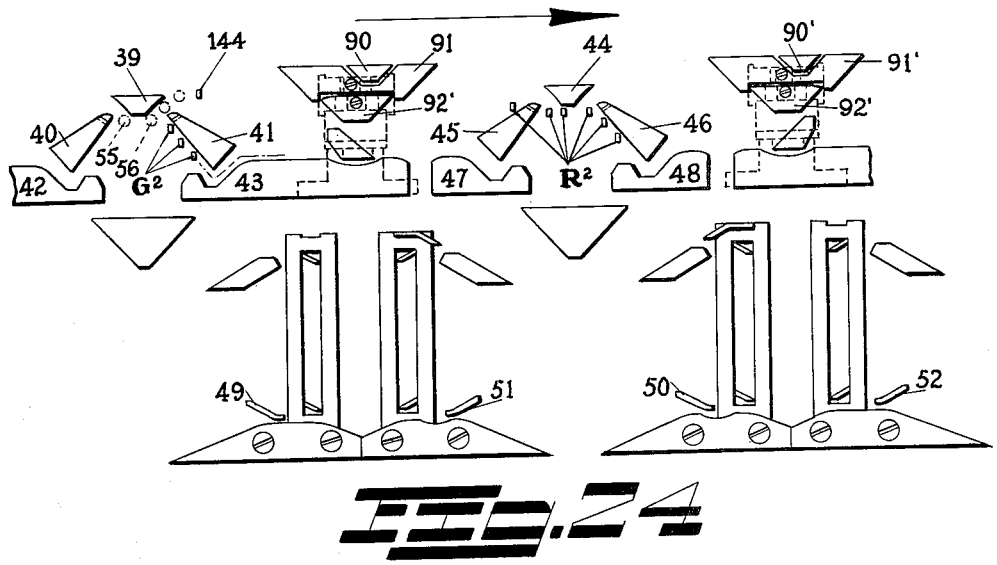
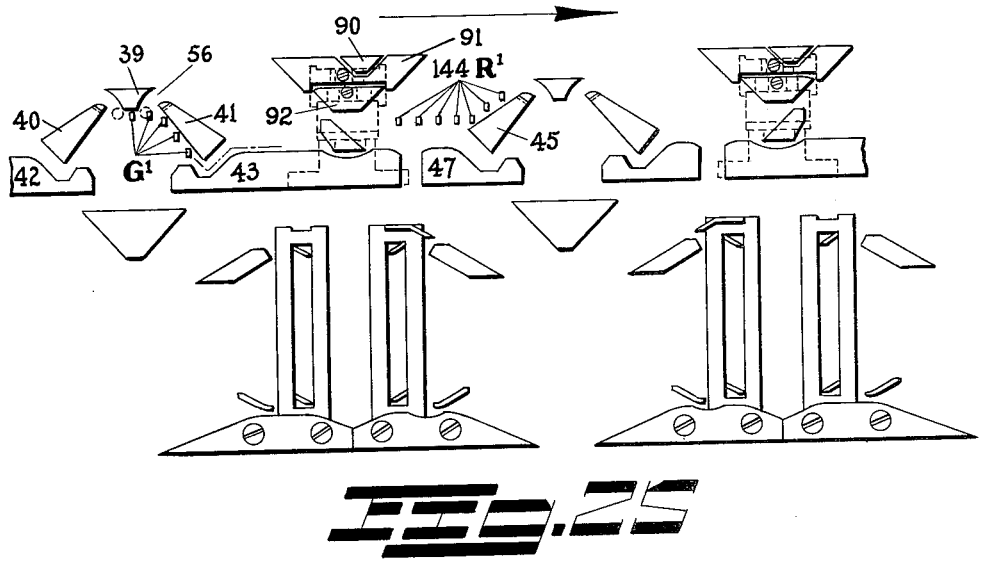

United States Patent Office 3,233,430
Patented Feb. 8, 1966

3,233,430
KNITTING METHOD
Oscar Fregeolle, Lincoln, R.I., assignor to Draper Corporation, Hopedale, Mass., a corporation of Maine
Filed Jan. 23, 1961, Ser. No. 84,058
4 Claims. (Cl. 66—43)

This invention relates to improvements in knitting, and, particularly, to a method for knitting a solid color tubular fabric.

It is the general object of the invention to provide an improved suture in reciprocatorily knit hosiery, and especially in solid color hosiery.

It is a further object of the invention to provide a method for knitting a solid color tubular fabric having an outer face wherein the seams joining adjacent pattern areas appear as much as possible as straight lines with no visible projection or instrusion of loops of one pattern area into an adjacent area, thus forming what is known in the art as "straight edges," at the same time minimizing the bulkiness of such seams by avoiding the use of tuck stitches and employing instead laterally extending bights of yarn to tie in the yarn of one area with that of an adjacent area.

It is another object to improve upon the edge construction between adjacent, reciprocatorily knitted areas as formed by hand knitting or hand framing hosiery and to accomplish that under production conditions in a fully automatic machine.

It is a further object to provide a method for knitting a vertical seam between two adjacent areas to be knitted in reciprocation with the same yarn, which seam shall be practically invisible and shall appear as much as possible as just an ordinary wale of fabric.

Further objects will be apparent from the description to follow.

United States Patent No. 2,217,022 and other improvement patents thereupon relate to a type of knitting machine with which the present invention is particularly concerned but to which the invention is not intended to be limited as it has application, in general, to circular, independent needle knitting machines capable of knitting in reciprocation. One such machine is designated as the Hemphill S.C.P. or the S.C.O.P. and is manufactured by The Banner Company of Pawtucket, Rhode Island. The machine includes a circular needle cylinder with independent needles therein which may be either rotated or reciprocated past relatively stationary cams, and it is preferably equipped with at least two yarn feeding stations. The angular extent of reciprocation is such that a group of needles may be passed thorugh a cam set twice in a single stroke. A selecting mechanism acts upon needle raising jacks to cause predetermined ones thereof to be raised to place needles into a knitting track or to be affected by narrowing picks which raise, one at a time and in either direction of rotation, certain of the needles to a higher level where their latches are cleared and their knitting function suspended as in the heel and toe.

The patterned parts of hosiery knitted by such a machine may be of practically any desired size, shape, and variety of colors and are usually knitted by reciprocation of the needle cylinder as are the heel and toe. The machine is particularly suitable for knitting Argyle patterns of diamond shaped areas of contrasting colors wherein each diamond may extend for about 180 degrees around the circumference of the article. Many other types of patterns may also be produced such as vertical panels, checker-boards, partial diamonds, etc. Up to the present time, however, it has been difficult to produce solid color patterns of contrasting colors adjoining areas of which were defined by clean, straight lines or edges. One recently proposed method suggests forming an edge by tucking the leading needle in each pattern area. While such a method is some improvement over the old method, it still does not produce as straight an edge as is desirable or as produced in hand knitting, and further, tuck stitches add to the bulkiness at the edges of pattern areas and the system is carried out only in a very complicated machine.

In some patterns produced on an SCP machine the article produced has an overlapping seam at the back which marks the junction of the two sides of the fabric as formed at the ends of the reciprocating strokes. In the past this seam has been relatively bulky when produced according to the conventional method of knitting and drawing loops on the seam needle twice in each course of fabric. This extra bulk along the seam necessarily makes the latter qiute obvious and leaves something to be desired.

According to the present invention it is now possible to knit solid color tubular fabric having pattern areas whose junctions define perfectly straight lines heretofore obtainable only by hand knitted methods. There is no longer any intermingling of colors on the face of the fabric where one color area meets another. The method may be utilized to equal advantage in patterns having only two contrastingly colored pattern areas in a course as well as in patterns having three, four, or more such areas. The junction between areas furthermore may extend vertically along a single wale or it may extend at an angle in either direction from the vertical crossing a plurality of wales as in the well-known Argyle patterns. A description of the method involved in the production of such a pattern according to the present invention will be related in detail as well as a description of the physical structure of the new seam and the added mechanism necessary to produce it.

Additional advantages will become apparent from a reading of the following more detailed description and drawings, wherein:

FIG. 1 is a plan view of a portion of a knitting machine including a feeding station and showing the novel narrowing picks applied thereto;

FIG. 2 is an elevational view of the structure shown in FIG. 1, also illustrating various pick positions;

FIG. 3 illustrates one of the narowing picks and its control mechanism;

FIG. 4 is a side elevation of a portion of FIG. 3 looking in the direction of the arrows 4—4;

FIG. 5 is a similar view looking in the direction of the arrows 5—5;

FIG. 6 is a front elevation of FIG. 3;

FIG. 7 is a plan view of the knitting machine showing the novel needle leveling and lowering cams and their controls;

FIG. 8 is a side elevational view of FIG. 7;

FIG. 8A illustrates the disc and cams for controlling the front set of leveling and lowering cams;

FIG. 9 is an enlarged plan view of a set of the leveling and lowering cams;

FIG. 10 is a front elevation thereof;

FIG. 11 is a side elevation thereof;

FIG. 12 is an enlarged stitch diagram of a portion of an Argyle pattern knitted in accordance with the invention and as seen from the back side of a stocking;

FIGS. 13 and 14 are diagrammatic representations of the entire circumference of the pattern in the leg portion of a stocking;

FIG. 15 is an enlarged stitch diagram of a seam knitted according to the preferred form of the invention; and FIGS. 16 to 25 are diagrammatic views of the needle cams as seen from the interior of the needle cylinder and indicating needle travel during knitting of various portions of an Argyle pattern in both directions of reciprocation of the needle cylinder.

Figure 20:
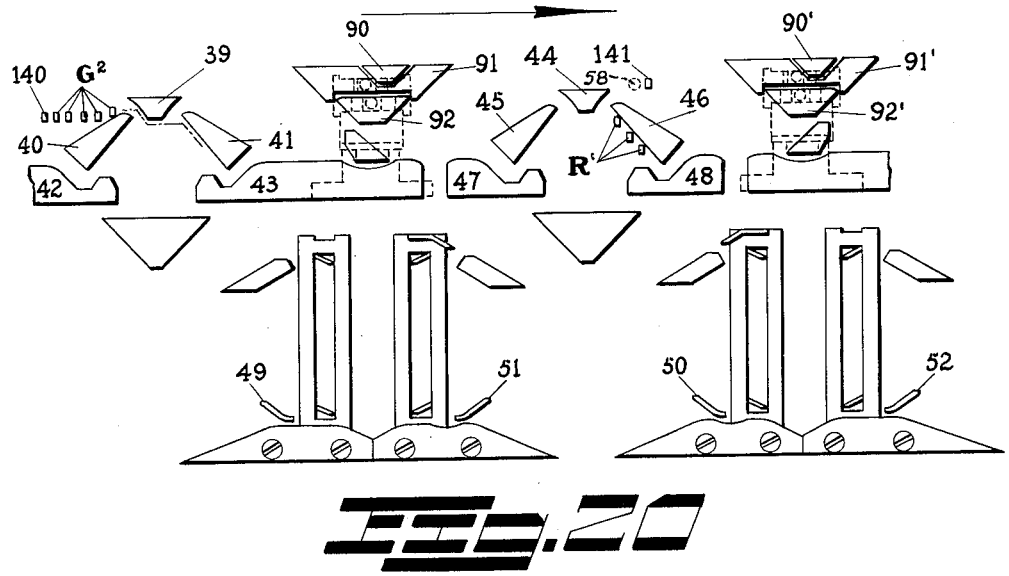
Figure 21:
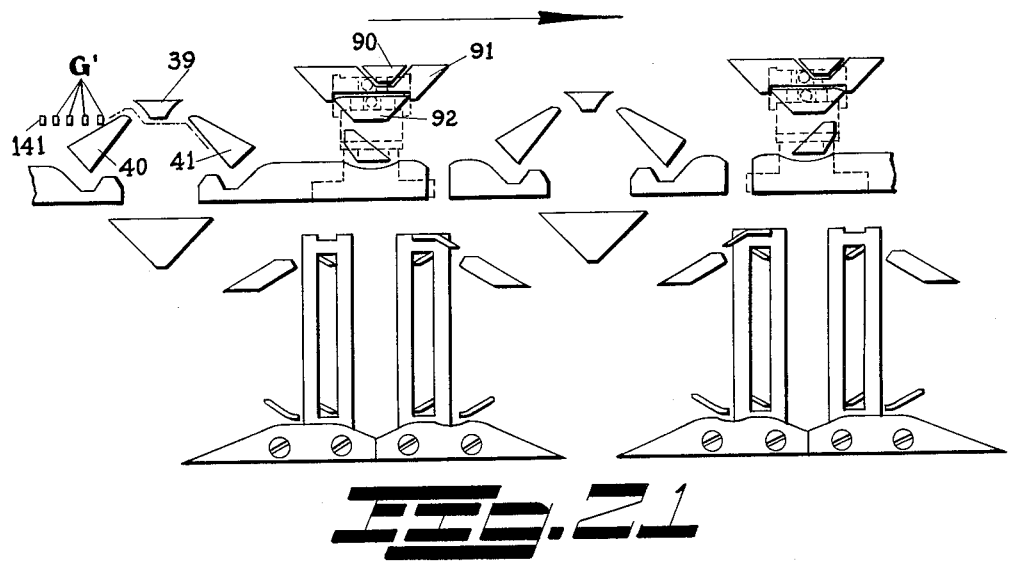

A knitting machine particularly adapted to carry out the present invention is the well-known Banner S.C.O.P. manufactured by The Banner company and which is completely described in United States Patent No. 2,217,022 and later patents. Portions of that machine pertinent to the present invention along with the modifications made thereto have been illustrated in various figures of the drawings. A needle cylinder 30 may be either rotated or reciprocated in known manner and includes needles 31 (FIG. 16) preferably of the latch type with butts 32 divided into three groups of varying lengths of butts. Each needle has a selecting jack 33 beneath it, each jack having selecting butts 34 capable of being selectively broken off to set up a pattern, a master butt 35 and a plain sole or cancelling out butt 36.

There are two knitting and feeding stations in this particular machine although there may, of course, be more. A regular or main feeding station 37 is located at the right hand side of the machine as seen from the front thereof, and an auxiliary station 38 at the left. The regular station includes, as seen in FIGS. 1, 2 and 16, a center cam 39 and stitch cams 40 and 41 on opposite sides thereof. Raise cams 42 and 43 complete the needle cams at that station.

The auxiliary station includes a center cam 44, stitch cams 45 and 46 and raise cams 47 and 48. Selecting Stations A and C function upon jacks to cause theme to be raised as their master butts contact master cams 49 or 50 when the needle cylinder is rotating in a counterclockwise direction, the jacks thereby raising their corresponding needles to be affected by the stitch cams. Similarly, cams 51 and 52 at Stations B and D function to raise jacks in a clockwise direction of rotation. Widening picks 53 and 54 function at the auxiliary station in a conventional manner. The mechanism thus far described is well known and is more fully described in United States Patent No. 2,217,022.

FIG. 16 illustrates the active end portions only of the novel narrowing picks 55 and 56 at the main feed and 57 and 58 at the auxiliary feed, these being shown in their various operating positions with respect to the needle cams. FIGS. 1 and 2 illustrate these picks in more complete detail and as applied to the regular feeding station, while FIGS. 3 to 6 show the mechanism for controlling one of these picks, it being understood that a similar set of picks acts at the other feeding station and that each of these four picks has a substantially similar control mechanism. As noted particularly in FIGS. 2 and 4 each of the picks comprises a somewhat U-shaped member having a base portion 59 from one end of which a leg 60 extends upwardly at about right angles thereto. The upper end of that leg terminates in a widened portion having a pocket 61 formed intersecting horizontal and vertical walls. A second bifurcated leg 62 extends obliquely outwardly from the opposite end of the base portion 59 and terminates with a rounded hub 63. The pick is pivotally mounted at 64 so that the pocket 61 is movable between the active solid line position of FIGS. 2 and 4 and the inactive position "a" by a positive control means to be described. The pocket 61 in the active solid line position is located in the pathway of the needle butts of those needles which have been selected to knit so that as the leading needle of the selected group enters the pocket, the pick is caused by the impact thereof to be moved to the dotted line position "b." The needle is thus picked from a position in the center of the cam block upwardly and outwardly therefrom in either direction of rotation of the cylinder.

The mechanism for controlling the positioning of the pick will now be described. That mechanism is comprised of what will be referred to as a first or primary control means and a second or secondary control means. The primary control means is illustrated in FIGS. 3 to 6 and acts in a positive manner upon the pick to withdraw it out of the path of the needle butts or else releases the pick into that path, all as controlled by cam means. A bell crank member 65 pivoted at 66 acts upon the hub 63 as controlled by a lever 67. The latter is connected by way of a link 68 pivoted at its center at 69 to a further link member 70. A cam follower arm 71 having a follower portion 72 is pivoted at 73 and mounted to receive indications from a disc 74 having frangible butts 75 mounted on a pattern drum D which is rotated in small increments in a known manner. At this point it will be evident that when the arm 71 is cammed outwardly by the butts 75, the pick 58 will be moved to the inactive position "a." The butts 75 are arranged on the disc 74 to render the pick 58 active whenever a straight edge is being knitted in accordance with the present invention; the butts are broken off where other portions of a stocking are being knitted.

An arm 76 is integrally formed with arm 71 to pivot therewith and is linked by way of a member 77 to the lower end of a pawl 78 pivoted at 79 and adapted to be influenced by a cam 80 fixed on the circumference of a rotating disc 81 and acting upon pawl portion 82. The disc 81 makes one complete revolution for each two complete oscillations of the needle cylinder, one in each direction of reciprocation. The purpose of the pawl 78 and its associated components is to render the pick 58 inactive during the knitting of a small portion or portions only in a given course of fabric for reasons later to be explained. Such control is not possible by means of the disc 74 alone which moves at a much slower rate than the disc 81.

The primary control means described to this point is utilized in pairs at each of the feeding stations, one for each pick and working from opposite sides of the cam block of each station. Additionally, there are times, such as during the knitting of the heel and toe, when it is desirable to keep the pick 58 in an active position for a prolonged period and out of the influence of the cam 80. For that reason a further secondary control means has been provided for one only of the two sets of picks to shog the pawl 78 out of the path of the cam 80. The upper portion of the pawl 78 is provided with a swivel connection 83 to permit that portion to be moved between the dotted and solid line positions shown in FIG. 3. The upper end of the pawl has a pin 84 extending horizontally outwardly therefrom which is receivable in an opening provided in the turned over end 85 of a further cam follower 86. The latter is pivoted intermediate its ends at 87 and is adapted to derive indications from selectively inserted pins 88 extending around the periphery of a drum 89. In this manner when the follower 86 is on the drum surface or in the solid line position of FIG. 3, the pawl portion 82 is out of the influence of cam 80 and when the follower 86 is affected by a pin 88, the pawl 78 is in line with the cam 80.

FIGS. 7 to 11 relate to a novel combination of needle draw down cams and controls therefor which may function in cooperation with the narrowing or widening picks to assure that the needle butts will approach the following cam block at a very definite, safe level. It sometimes happens that a needle is picked to too high a level by a narrowing pick due to improper friction between the needle and its slot with the result that the needle strikes an inactive yarn lever and the needle breaks or other damage occurs. At other times when a needle is lowered by a widening pick, if it is not at the proper level, a smash into the cam block may result. To overcome these difficulties, the cams shown in elevation in FIG. 10 have been devised which include an upper fixed cam 90, a movable intermediate cam 91, and a lower fixed cam 92. Each of these cams is effective upon needle butts in either direction of rotation of the needle cylinder. They are preferably located at both the front and rear centers of the machine approximately half-way between the cam blocks as shown in FIGS. 7 and 8. The cams 90 and 92 are separated by a distance sufficient to permit needle butts to pass therebetween. Cam 91 is constructed so that when in the active position it renders the cam 90 ineffective and acts to lower needle butts to be affected further by cam 92.

When needles are picked to a latch clearing position to pass up over the cam block such as takes place when knitting a straight edge according to the present invention as will later be described, the movable cam 91 is in against the cylinder and the previously raised needles are lowered by cams 91 and 92 into the knitting track 93 to knit at the following cam block.

When working in the heel and toe, the movable cam is out and during narrowing needle butts are raised to pass between the fixed cams at the level 94. If a needle is picked too high, cam 90 lowers it to that level. When widening starts, the widening picks 53 and 54 lower needle butts down into the path of cam 92 which causes them to enter the knitting track 93 at a constant level.

The cam 92 is mounted on a supporting bracket 95. The cam 91 is formed separately from a slidable supporting member 96 to the inner end of which it is attached by a screw 96′ or other suitable fastening means. This type of construction eliminates a large amount of machining which would be necessary if the cam and its supporting member were formed from an integral piece of metal. The slidable member 96 is enclosed within a housing including side members 97 and 98 and a top member 99 with which the cam 90 is integrally formed. A spring 100 is attached at one end to the side member 97 and at the other end to a pin 101 extending laterally outwardly from a flange 102 formed at the outer end of slidable member 96, thereby to urge the movable cam inwardly against the cylinder. A set screw 103 limits the inward movement.

The member 96 is moved in the opposite direction by means of a bell crank 104 pivotally mounted at 105, one arm of which acts upon a pin 106 fixed to the side of the member. The bell crank is actuated by a vertically extending rod 107 whose lower end is adapted to derive an indication from any one of the cams 108, 109 or 110 spaced around the periphery of the disc 111 which is rotatably mounted on the main pattern shaft 112.

The draw down cams at the rear of the machine are identical to those at the front and are noted with similar reference numerals in primes (FIGS. 7, 8 and 16). The movable cam 91′, however, is moved positively in both directions as controlled by a link 113 connected to a bell crank 114. The latter is affected by a linkage system 115, 116 and 117 which is controlled by a follower arm 118 pivoted at 119 and adapted to be affected by any one of cams 120, 121, or 122 fixed to the periphery of cam disc 123 also mounted on the main pattern shaft.

FIGS. 13 and 14 illustrate a section of the well-known Argyle pattern which has been split along the rear central wale of a stocking while FIG. 12 represents the actual stitch construction of the area 124 showing the two types of straight edges knitted in accordance with the present invention, and as seen from the inside or back of the fabric. The shaded areas of fabric may be assumed to be knitted with red yarn and the unshaded areas with grey yarn for purposes of simplicity, although, if desired, each of the diamonds may be knitted of a different color. The seams 125 and 126 were knitted by the "crossed yarn" method while seams 127 and 128 were knitted by the "raised needle" method, the formation of both of which will shortly be described in complete detail, although these form no part of the present claimed invention and are described merely to illustrate an alternative method which may be practiced on the machine. In each case the interlocking of the red and grey yarns is visible only on the back side of the fabric, thereby giving the appearance of clean, straight lines to the seams on the opposite side. The odd numbered courses 129, 131, etc., are knitted with the needle cylinder traveling in one direction of rotation and courses 130, 132 and 134 in the opposite direction. Seam 125 is comprised of single stitches "d" of red yarn drawn through single stitches "e" of grey yarn, and further of floats "f" of red yarn extending laterally and downwardly across the odd numbered courses and interlinked with floats "g" of grey yarn extending across the even numbered courses.

Similarly, the seam 126 is comprised of single loops or stitches "h" of grey yarn drawn through single stitches "i" of red yarn. Floats "j" of red yarn and "k" of grey yarn alternately spaced are interlinked along that seam.

Seam 127 differs somewhat in structure from either of those described above and is comprised essentially of single stitches "l" of grey yarn in alternate courses drawn through previously formed single stitches "m" of grey yarn and also through laterally extending bights "n" of red yarn.

Seam 128 is similar to 127 and is comprised of single stitches "o" of red yarn in alternate courses drawn through previously formed stitches "p" of red yarn and also through laterally extending bights "q" of grey yarn.

The manner in which the pattern of FIGS. 13 and 14 may be knitted will now be related, wherein seams 125 and 126 will be formed by the "crossed yarn" method, and seams 127, 128 and 135 to 138 will be formed by the "raised needle" method. Further, it will be assumed that red yarn is to be knitted in diamonds $R^1$ and $R^2$ at the auxiliary feed and grey yarn in diamonds $G^1$ and $G^2$ at the regular feed. Assuming further that knitting is taking place in that area where widening of the red diamonds occurs (for example, in that area between courses 129 and 134 in FIG. 12), the picks 55 and 56 at the regular feeding station are rendered inactive by providing butts 75 in the corresponding portion of the disc 74 to withdraw the arm 71 of each outwardly. Then, as the needle cylinder is rotating in a counterclockwise direction and during the knitting, for example, of course 132 (see FIGS. 12 and 16), the needle 139 in grey panel $G^2$ immediately adjacent the seam 135 together with all the needles in red panel $R^1$ is selected at Station C by means of plungers acting upon the selecting butts of those needles' jacks, the jacks being raised further as the master cam 50 acts upon master butts 35. The needle 139, after passing over the back of cam 46 and between the space provided between pick 58 and cam 39 (see FIGS. 2, 3, and 4) is raised by the auxiliary narrowing pick 57 to a latch clearing position over the top of cam 45. At this time the yarn finger (not shown) for feeding red yarn to the panel $R^1$ needles is in feeding position and as the needle 139 passes in front of that finger, yarn is caused to be wrapped around its shank, and the immediately following $R^1$ needles are caused to knit at the auxiliary feed (FIG. 16). Grey panel $G^2$ needles pass inactively under that cam block.

Pick 57 is now pulled out of action by means of its cam 80 acting upon the pawl 78. Panel $G^2$ needles are selected to knit at the regular feed, and needle 139 is lowered by cams 91 and 92 and knits last with that group to form a stitch in suture 135 which is similar to stitch "l" in course 131 in FIG. 12. (See FIG. 17.)

Next the panel $G^1$ needles are selected to knit at the regular feed (FIG. 18) and red panel $R^2$ needles at the auxiliary feed, no needle of the latter group being picked due to the inactive position of the pick 57. As the panel $R^2$ yarn starts to knit, it first crosses over the panel $G^1$ yarn to form automatically the seam 125 (yarn "f," course 132 in FIG. 12) due to the positions of the two yarns with respect to their feeding fingers. A complete course of fabric has now been knitted as the cylinder completes its rotation in one direction.

In the clockwise direction of rotation the pick 58 is back in an active position (FIG. 19) and at the auxiliary feed a needle 140 in grey panel $G^2$ immediately adjacent seam 137 together with all the red needles in panel R² are selected to knit a part of course 133 in FIG. 12, the needle 140 being raised by the pick 58 to a latch clearing position over the top of cam 46. Red yarn in panel R² is wrapped around the shank of the raised needle and then that yarn is knitted on the following R² needles.

During that time that G¹ needles are passing through the auxiliary station at a low inactive level and after all R² needles have knitted at that station, pick 58 is returned by a spring (not shown) to its lower operative level and to a position to be operative upon another needle during that same stroke.

Needle 140 is lowered by cams 91' and 92' and then knits together with the grey panel G² needles at the regular feed (FIG. 20). At the auxiliary feed a needle 141 in grey panel G¹ immediately adjacent seam 127 is selected to knit and then raised by pick 58 to a latch clearing position over the top of cam 46. Red panel R¹ yarn is wrapped around the shank of that needle and then knitted on the immediately following panel R¹ needles.

Finally, needle 141 is lowered by cams 91' and 92', the grey panel G¹ yarn crosses over the adjacent panel R² yarn to form a partial course 133 of a "crossed yarn" seam 125, (FIG. 12), and the G¹ yarn is knitted with needle 141 knitting last with that group. That completes a second course of knitting or a complete cycle where widening in the red diamonds is taking place. Of course, as long as widening does take place, the needle to be raised by the picks is one removed from the one previously raised along any given seam except for the seam 125 which is formed by crossing of yarns only.

Figure 22:
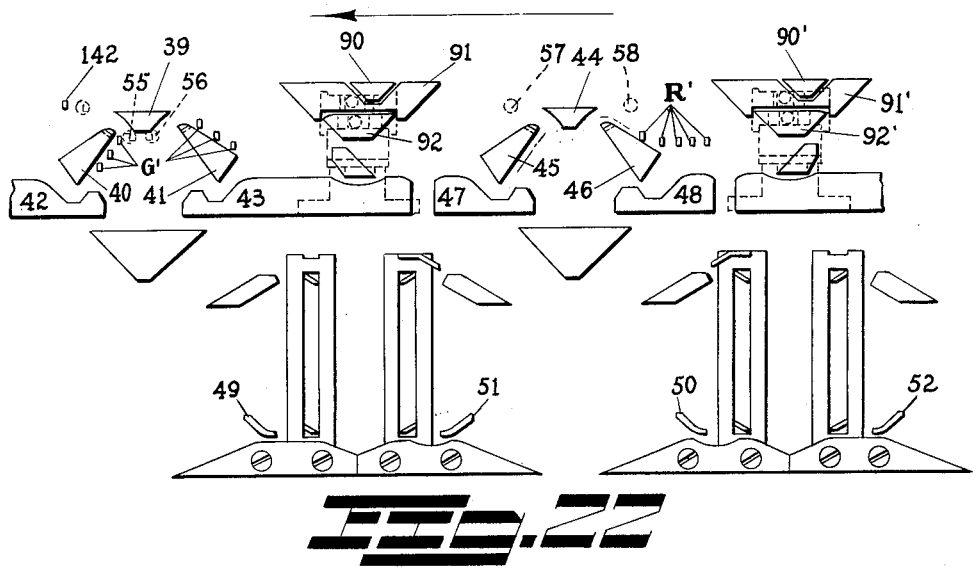
Figure 23:
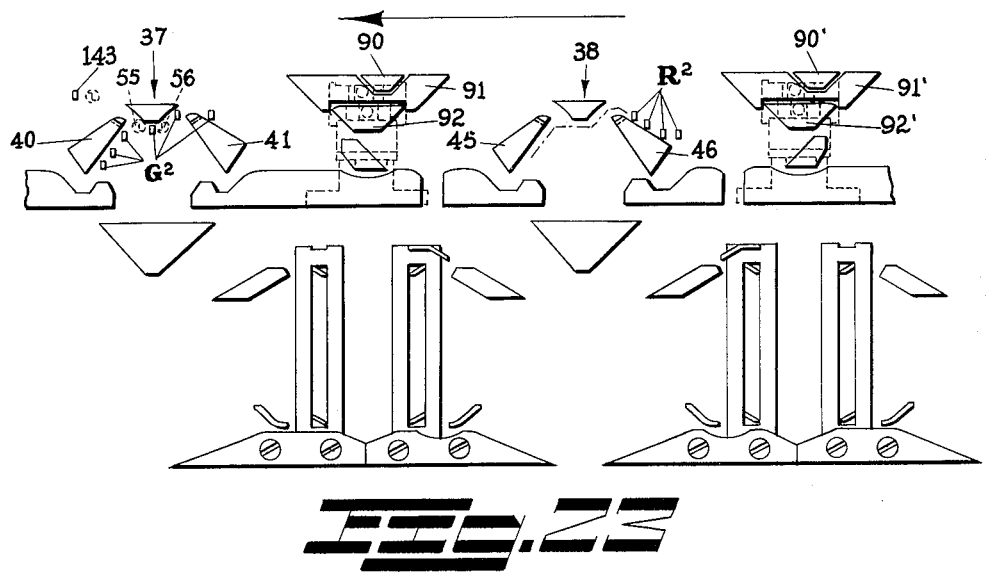

When narrowing, or when knitting in the lower half of the red diamonds begins to take place, the auxiliary picks 57 and 58 are rendered inactive by means of butts 75 urging the arms 71 outwardly as previously with respect to the regular picks. Now assuming that the first course to be knitted in narrowing takes place with the needle cylinder moving in a counterclockwise direction, or with needles moving from right to left in the direction of the arrow in FIG. 22, a needle 142 in red panel R¹ immediately adjacent seam 128 is selected to knit as well as needles in grey panel G¹ at the regular feeding station. Needle 142 is raised to a latch clearing position by means of the pick 55 to pass over stitch cam 40, grey yarn of panel G¹ is wrapped around the shank of that needle, and the selected needles except 142 knit grey yarn in panel G¹. The needles in red panel R¹ are selected to knit at the auxiliary feed, needle 142 being lowered by cams 91' and 92' to knit with that group.

As the cylinder rotates still further in the same direction, a needle 143 in panel R² immediately adjacent seam 138 is selected to knit together with needles in panel G². Needle 143 is raised to a latch clearing position up over stitch cam 40 by means of the pick 55, panel G² yarn is wrapped around the shank of that needle, and the panel G² needles then knit at the regular feed.

At the auxiliary feed the panel R² yarn crosses over the adjacent panel G¹ yarn to form seam 126 automatically as the panel R² needles are selected to knit (needle 143 now knitting, also), thereby completing a course in the counterclockwise direction.

As the cylinder next rotates in the clockwise direction, the panel R² needles are selected to knit at the auxiliary feed (FIG. 24). At the regular feed a needle 144 in panel R¹ immediately adjacent seam 136 is selected to knit along with the grey panel G² needles. Needle 144 is raised to a latch clearing position by the pick 56, panel G² yarn is wrapped around its shank, and the panel G² needles then knit. The narrowing pick 55 is now out of action due to the action of its cam 80. The panel G¹ yarn crosses over the adjacent R yarn to form seam 126 and then the panel G¹ needles knit at the regular feed. Last of all the panel R¹ needles together with needle 144 knit at the auxiliary feed, needle 144 having been lowered into the knitting track by cams 91 and 92.

These narrowing steps continue until the red panels have been completed. Again, as subsequent courses are being knitted the needle to be raised at any given seam is one removed from the previously so selected needle.

As knitting begins in the heel and toe, the secondary control for the pick 58 comes into play to render that pick inactive by shogging the pawl 78 to the solid line position of FIG. 3 and then knitting proceeds in the usual manner with widening picks 53 and 54 now functioning.

The invention may be used to special advantage in knitting a completely new type of seam along the rear central wale of a stocking which is far superior to such seams of the prior art in that it is practically invisible and free of bulk and which constitutes the claimed subject matter of the invention. The stitch structure of such a seam is shown in FIG. 15, the two sides thereof being shown as shaded areas 145 and plain areas 146 merely to distinguish the end of knitting in one direction and the beginning of the knitting in the opposite direction. Normally, both sides of the seam will be knitted with the same yarn. The seam at alternate courses is formed of stitches 147 drawn through previously knitted stitches 148 and also through laterally extending bights of yarn 149 while in the intermediate courses the stitches 148 are drawn through previously formed stitches 147 and laterally extending bights of yarn 150.

This seam is formed by rotating the needle cylinder in a clockwise direction and then raising the seam needle to a latch clearing position at the regular feeding station by means of the pick 56. At this time the yarn feeding lever is in the active position to cause yarn to be wrapped around the seam needle. All the following needles then knit at the regular feed. The seam needle passes over the auxiliary block and is picked down by the rear widening pick 54 and then knits at the regular side after the immediately preceding needles have knitted and drawing its stitch through the previously formed seam stitch and through the wrapped bight of yarn.

The cylinder is then rotated in the opposite direction, the seam needle is again raised to a latch clearing position over the regular cam block this time by the pick 55, and yarn is again wrapped around its shank. At the auxiliary feed the needle is again lowered into the knitting track by means of pick 53 and knits at the regular feed.

Alternatively, the seam needle may be lowered back into the knitting track by proper control of the draw down cams 91, 92 and 91', 92'.

In the Argyl pattern described above which includes four seams in a given course, three of the seams have been described as formed by the "raised needle" method and the fourth by the "crossed yarn" method. Whichever type of seam is being formed, at no time does any needle draw more than a single loop or stitch at a time or through more than a single previously drawn stitch. In the raised needle method the raised needles draw their stitches through a single previously drawn stitch and through the wrapped bight of yarn, but since that bight never enters into the hook of the needle, in the fabric it merely appears as a laterally extended connecting yarn to tie in one of the pattern areas with that adjacent. It is, in a sense, treated as an inlaid yarn would be but since the course direction reverses at that point, it merely casts off as a laterally extending bight. There being no time at which there are two loops in a needle hook at once, there can be no walewise accumulation of loops, thus no tuck stitches are formed. No added bulk is forthcoming.

While an Argyle pattern has been chosen for purposes of illustration only, it is to be understood that many other patterns may be knitted incorporating the advantages of the present invention, such as patterns having vertically extending edges only, narrowing, widening, or any combination thereof.

While one embodiment of the invention has been disclosed, it is to be understood that the inventive concept may be carried out in a number of ways. This invention

I claim:

1. A method of knitting a seam in a tubular fabric on a circular, independent needle, knitting machine which comprises rotating the needle cylinder in one direction, raising the seam needle to a latch clearing position at a feeding station, wrapping a bight of body yarn around said raised needle and knitting said yarn on following needles, then drawing a stitch with said raised needle through said wrapped bight of yarn and through a previously drawn stitch at said feeding station, rotating said cylinder in the opposite direction, raising said needle again to a latch clearing position, wrapping a further bight of body yarn around said raised needle and knitting said body yarn on following needles, and drawing a stitch with said raised needle through said further bight of yarn and through the previously drawn stitch.

2. The method of claim 1 wherein said raised needle is lowered into a knitting track by pick means.

3. The method of claim 1 wherein said raised needle is lowered into a knitting track by means of a cam.

4. The method of claim 1 wherein both sides of said seam are knitted with the same yarn.

References Cited by the Examiner
UNITED STATES PATENTS

| | | | |
|---|---|---|---|
| 1,052,877 | 2/1913 | Ames | 66—43 |
| 1,252,983 | 1/1918 | Ames | 66—179 |
| 1,467,549 | 9/1923 | Lawson | 66—179 |
| 1,673,766 | 6/1928 | Gagne | 66—179 |
| 2,179,336 | 11/1939 | Lawson | 66—179 |
| 2,263,830 | 11/1941 | Smith | 66—43 |
| 2,271,386 | 1/1942 | Booton et al. | 66—48 |
| 2,405,405 | 8/1946 | Cole | 66—48 |
| 2,437,841 | 3/1948 | St. Pierre | 66—179 |
| 2,785,554 | 3/1957 | Canavan | 66—43 |
| 2,939,302 | 6/1960 | Letzerich | 66—43 |
| 3,018,647 | 1/1962 | Levin | 66—179 |

DONALD W. PARKER, *Primary Examiner.*

RUSSELL C. MADER, *Examiner.*